US010209769B2

(12) United States Patent
Goossens et al.

(10) Patent No.: US 10,209,769 B2
(45) Date of Patent: Feb. 19, 2019

(54) VIRTUAL REALITY HEADSET

(71) Applicant: GOOGLE INC., Mountain View, CA (US)

(72) Inventors: Erik Hubert Dolly Goossens, San Francisco, CA (US); Damien Henry, Malakoff (FR); Alejandro José Kauffmann, San Francisco, CA (US); Antonio Bernardo Montiero Costa, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 329 days.

(21) Appl. No.: 15/158,141

(22) Filed: May 18, 2016

(65) Prior Publication Data
US 2016/0349836 A1 Dec. 1, 2016

Related U.S. Application Data

(60) Provisional application No. 62/167,266, filed on May 27, 2015.

(51) Int. Cl.
G02B 27/22 (2018.01)
G06F 3/01 (2006.01)
G02B 7/02 (2006.01)

(52) U.S. Cl.
CPC ............ *G06F 3/011* (2013.01); *G02B 27/22* (2013.01); *G02B 27/2257* (2013.01); *G06F 3/01* (2013.01); *G02B 7/021* (2013.01)

(58) Field of Classification Search
CPC ... G06F 3/011; G06F 3/01; G06F 3/00; G06F 3/02; G02B 7/02; G02B 7/00; G02B 27/2257; G02B 3/02

(Continued)

(56) References Cited

U.S. PATENT DOCUMENTS 4,773,747 A * 9/1988 Bresnahan ............... G02B 7/12
359/408
4,846,553 A * 7/1989 Rice .................. G02B 27/2257
359/408

(Continued)

FOREIGN PATENT DOCUMENTS

CN 204188882 U 3/2015
EP 0708350 A1 4/1996

(Continued)

OTHER PUBLICATIONS

"Google Cardboard", promotional materials found at www.goggle.com/cardboard, printed May 12, 2015, first available approximately Jun. 27, 2014., 3 pages.

(Continued)

Primary Examiner — William R Alexander
(74) Attorney, Agent, or Firm — Brake Hughes Bellermann LLP

(57) ABSTRACT

In an implementation, a virtual reality (VR) headset can include a plurality of structural components. Each structural component can be formed from a respective cardboard sheet. The plurality of structural components can include a plurality of flaps that define an opening for placement of the VR headset near or against a face of a user in a first configuration, an internal wall of the VR headset, a bottom wall of the VR headset, a lens frame assembly, a top wall of the VR headset and an enclosure flap hingeably coupled with the bottom wall of the VR headset. The enclosure flap can, in a first configuration, secure an electronic device in the VR headset against the internal wall. In a second configuration, the enclosure flap can enclose the plurality of flaps that define the opening between the internal wall and the enclosure flap.

20 Claims, 14 Drawing Sheets

(58) Field of Classification Search
USPC .......................................... 359/817, 819, 477
See application file for complete search history.

(56) References Cited

U.S. PATENT DOCUMENTS

| | | | |
|---|---|---|---|
| 5,344,065 | A | 9/1994 | Moran |
| D374,002 | S | 9/1996 | Bassett et al. |
| D415,146 | S | 10/1999 | Koichiro |
| 6,046,727 | A | 4/2000 | Rosenberg et al. |
| D427,982 | S | 7/2000 | Daisuke |
| D444,155 | S | 6/2001 | Morooka et al. |
| D601,641 | S | 10/2009 | Wa-Sang |
| 8,303,123 | B2 | 11/2012 | Kory |
| D687,434 | S | 8/2013 | Serota |
| D701,206 | S | 3/2014 | Luckey et al. |
| 8,686,959 | B2 | 4/2014 | Payne et al. |
| D704,704 | S | 5/2014 | Tatara et al. |
| D719,953 | S | 12/2014 | Nokuo et al. |
| 8,908,015 | B2 | 12/2014 | Capper et al. |
| 8,957,835 | B2 | 2/2015 | Hoellwarth et al. |
| D727,318 | S | 4/2015 | Garcia |
| D732,028 | S | 6/2015 | Kim et al. |
| D738,374 | S | 9/2015 | Luckey et al. |
| D739,855 | S | 9/2015 | Bosveld et al. |
| D740,810 | S | 10/2015 | Bosveld et al. |
| D740,814 | S | 10/2015 | Bosveld et al. |
| D741,323 | S | 10/2015 | Bosveld et al. |
| D741,327 | S | 10/2015 | Vladimir |
| 9,176,325 | B2 | 11/2015 | Lyons |
| D745,517 | S | 12/2015 | Kumagai |
| D749,583 | S | 2/2016 | Trexler et al. |
| D750,074 | S | 2/2016 | Coz et al. |
| D751,072 | S | 3/2016 | Lyons et al. |
| D753,111 | S | 4/2016 | Zhu et al. |
| D755,789 | S | 5/2016 | Lyons et al. |
| D757,003 | S | 5/2016 | Dolly |
| 9,405,126 | B1* | 8/2016 | Margolin ........... G02B 27/2257 |
| D765,658 | S | 9/2016 | Spio et al. |
| D766,896 | S | 9/2016 | Lou et al. |
| D792,398 | S | 7/2017 | Costa et al. |
| 9,869,874 | B2* | 1/2018 | Zhang ................ G02B 27/2257 |
| 2010/0079356 | A1 | 4/2010 | Hoellwarth et al. |
| 2010/0277575 | A1* | 11/2010 | Ismael ................ G02B 27/2242 |
| | | | 348/53 |
| 2013/0082963 | A1* | 4/2013 | Chu ....................... G03B 17/08 |
| | | | 345/173 |
| 2013/0147721 | A1 | 6/2013 | McGeever et al. |
| 2014/0176608 | A1 | 6/2014 | Boysen et al. |
| 2014/0247246 | A1 | 9/2014 | Maus |
| 2014/0267637 | A1 | 9/2014 | Hoberman et al. |
| 2015/0111624 | A1* | 4/2015 | Peel ..................... H04B 1/3877 |
| | | | 455/575.8 |
| 2015/0138645 | A1 | 5/2015 | Kim et al. |
| 2015/0215608 | A1 | 7/2015 | Tahara |
| 2015/0234189 | A1 | 8/2015 | Lyons et al. |
| 2015/0253574 | A1* | 9/2015 | Thurber ............. G02B 27/0172 |
| | | | 359/630 |
| 2016/0018853 | A1* | 1/2016 | Buckley ............. G02B 27/0176 |
| | | | 345/174 |
| 2016/0025990 | A1 | 1/2016 | Zhang |
| 2016/0062454 | A1 | 3/2016 | Choi et al. |
| 2016/0180591 | A1 | 6/2016 | Chang et al. |
| 2016/0203642 | A1 | 7/2016 | Thomas |
| 2016/0232715 | A1* | 8/2016 | Lee ....................... G06T 19/006 |
| 2016/0349836 | A1 | 12/2016 | Goossens et al. |
| 2017/0031164 | A1 | 2/2017 | Costa et al. |
| 2017/0031165 | A1 | 2/2017 | Costa et al. |
| 2017/0108703 | A1* | 4/2017 | Kong ................. G02B 27/2257 |

FOREIGN PATENT DOCUMENTS

| | | | | |
|---|---|---|---|---|
| EP | 2942305 | A1 | 11/2015 | |
| ES | 1115455 | U | 7/2014 | |
| GB | 2516242 | A | 1/2015 | |
| JP | 2007075300 | A * | 3/2007 | ............. G02B 27/22 |
| WO | 2012/035174 | A1 | 3/2012 | |
| WO | 2014057557 | A1 | 4/2014 | |
| WO | WO-2014057557 | * | 4/2014 | ............. G02B 27/22 |
| WO | 2014103006 | A1 | 7/2014 | |
| WO | 2014108693 | A1 | 7/2014 | |

OTHER PUBLICATIONS

"Multipart Plan" dated Feb. 26, 2014, 1 page.
"Photo 1" posted to Instagram by inventor on Oct. 6, 2013, 1 page.
"Photo 2" posted to Instagram by inventor on Oct. 6, 2013, 1 page.
"Photo 3" posted to Instagram by inventor on Oct. 6, 2013, 1 page.
Notice of Allowance for U.S. Appl. No. 29/516,996, dated Oct. 23, 2015, 12 pages.
Notice of Allowance for U.S. Appl. No. 29/528,284, dated Feb. 5, 2016, 6 pages.
Kastrenakes, "The VERGE: This phone's packaging doubles as a Google Cardboard VR viewer", Feb. 10, 2016, 2 pages.
Invitation to Pay Additional Fees and Partial Search Report received for PCT Patent Application No. PCT/US2016/033212, dated Aug. 1, 2016, 7 pages.
Brewster, "Why Google Cardboard is actually a huge boost for virtual reality", retrieved on Jun. 24, 2016 from https://gigaom.com/2014/06/28/why-google-cardboard-is-actually-a-huge-boost-for-virtual-reality/, Jun. 28, 2014, 7 pages.
"DODOcase Virtual Reality Kit 1.2 Assembly Instruction Video YouTube", retrieved on Jun. 24, 2016 from https://www.youtube.com/watch?v=ze1528521Yw, Oct. 8, 2014, 3 pages.
Evans, "The Exciting Possibilities of DIY Virtual Reality", retrieved on Jun. 24, 2016 from http://blog.fictiv.com/posts/the-exciting-possibilities-of-diy-virtual-reality, Dec. 8, 2014, 11 pages.
Hoberman, et al., "Immersive Training Games for Smartphone-Based Head Mounted Displays", retrieved on Jun. 24, 2016 from http://projects.ict.usc.edu/mxr/wp-content/uploads/2011/12/SmartphoneVR.pdf, 2012, 2 pages.
Ladysith, "Copper tape touch extension for Cardboard VR kits", retrieved on Jun. 24, 2016 from https://web.archive.org/web/20150101222824/http://www.instructables.com/id/CoppertapetouchextensionforCardboardVRkits, Jan. 1, 2015, 5 pages.
International Search Report and Written Opinion from PCT/US16/34756, dated Sep. 2, 2016, 10 pages.
International Search Report and Written Opinion from PCT/US16/33212, dated Sep. 23, 2016, 15 pages.
Touthackamon, "How to make DODOCase VR kit V 1.2 from your old V 1.1", retrieved on Jun. 24, 2016 from https://web.archive.org/web/20141101135535/http://www.instructables.com/id/How-to-make-DODOCase-VR-kit-V-12-from-your-old-V-1/, Nov. 1, 2014, 8 pages.
Non-Final Office Action for U.S. Appl. No. 14/815,124, dated Jan. 18, 2017, 28 pages.
International Search Report and Written Opinion for PCT Application No. PCT/US2016/43492, dated Dec. 2, 2016, 13 pages.
Non Final Office Action for U.S. Appl. No. 14/617,223, dated Feb. 27, 2017, 45 pages.
Notice of Allowance for U.S. Appl. No. 29/534,813, dated Mar. 21, 2017, 39 pages.
Response to Final Office Action for U.S. Appl. No. 14/815,124, filed Jul. 13, 2017, 8 pages.
Written Opinion for PCT Application No. PCT/US16/34756, dated Jul. 3, 2017, 5 pages.
International Preliminary Report on Patentability for PCT Application No. PCT/US2016/034756, dated Oct. 20, 2017, 7 pages.
Invitation to Pay Add'l Fees and Partial Search Report from Application No. PCT/US2016/43492, dated Oct. 6, 2016, 7 Pages.

* cited by examiner

VIRTUAL REALITY HEADSET

CROSS REFERENCE TO RELATED APPLICATION(S)

This application is a non-provisional of, and claims priority to, U.S. Provisional Application No. 62/167,266, filed May 27, 2015, entitled "Virtual Reality Headset," the disclosure of which is incorporated herein in its entirety.

TECHNICAL FIELD

This disclosure relates to virtual reality headsets. More specifically, this disclosure relates to virtual reality headsets that can be used in conjunction with user electronic devices running virtual reality applications.

SUMMARY

In a general aspect, a virtual reality headset can include a plurality of structural components, where each structural component can be formed from a respective cardboard sheet. The plurality of structural components being folded to form the VR headset. The plurality of structural components can include a plurality of flaps that define an opening for placement of the VR headset near or against a face of a user in a first configuration of the VR headset, an internal wall of the VR headset, a bottom wall of the VR headset, a lens frame assembly, a top wall of the VR headset and an enclosure flap hingeably coupled with the bottom wall of the VR headset. The enclosure flap can be configured, in the first configuration of the VR headset, to secure an electronic device in the VR headset against the internal wall. In a second configuration of the VR headset, the enclosure flap can be configured to enclose the plurality of flaps that define the opening between the internal wall and the enclosure flap.

Implementations can include one or more of the following features. For instance, the plurality of structural components can include a top rail hingeably connected to the internal wall. The top rail can be disposed within the VR headset and include an input mechanism. The input mechanism can include an input button disposed on the top rail and a hammer structure coupled with the top rail. The hammer structure can be configured to extend through an opening in the internal wall in response to the input button being depressed. The input mechanism can include a conductive material extending between the input button and the hammer structure. The conductive material can electrically couple the input button to the hammer structure.

The VR headset can include a pair of aspherical lenses disposed in the lens frame assembly such that images displayed on a display panel of the electronic device disposed in the VR headset against the internal wall of the VR headset are viewable through the pair of aspherical lenses. The VR headset can include a silicone pad disposed on an inner surface of the enclosure flap.

The plurality of flaps can include a first side flap, a second side flap and a top flap disposed between the first side flap and the second side flap. The top flap can have a curved cutout configured to be place against or near a forehead of a user. In the first configuration of the VR headset, the first side flap can be fastened to a first internal side wall of the VR headset and the second side flap can be fastened to a second internal side wall of the VR headset. In the first configuration of the VR headset and in the second configuration of the VR headset, the enclosure flap can be fastened to an internal top wall of the VR headset.

In another general aspect, a virtual reality (VR) headset can include a first structural component, a second structural component and a third structural component. The first structural component can include a plurality of flaps that define an opening for placement of the VR headset near or against a face of a user, a first portion of an internal wall of the VR headset, a first portion of a bottom wall of the VR headset, an inner layer of a lens frame assembly and a first outer layer of the lens frame assembly. The second structural component can include a second portion of the internal wall of the VR headset. The second portion of the internal wall can be fixedly attached to the first portion of the internal wall. The second structural component can further include a top wall of the VR headset, a second outer layer of the lens frame assembly a second portion of the bottom wall of the VR headset and an enclosure flap hingeably coupled with the second portion of the bottom wall of the VR headset. The enclosure flap can be configured to secure an electronic device in the VR headset and against the internal wall. The third structural component can include a third portion of the internal wall of the VR headset. The third portion of the internal wall can be fixedly attached to the second portion of the internal wall. The third structural component can also include a top rail with an input mechanism. The top rail can be hingeably connected to the third portion of the internal wall.

Implementations can include one or more of the following features. For instance, the plurality of flaps can include a first side flap, a second side flap and a top flap disposed between the first side flap and the second side flap. The top flap can have a curved cutout configured to be placed against or near a forehead of a user. The first side flap, the second side flap and the top flap can be foldable such that they are disposed between the internal wall and the enclosure flap.

The VR headset can include a pair of aspherical lenses disposed in the lens frame assembly such that images displayed on a display panel of an electronic device disposed in the VR headset between the enclosure flap the internal wall of the VR headset are viewable through the pair of aspherical lenses. An aspherical lens of the pair of aspherical lenses can be disposed within a lens opening defined in the inner layer of the lens frame assembly and held in place by a plurality of retention tabs disposed around a perimeter of the aspherical lens. The plurality of retention tabs can be disposed between the first outer layer of the lens frame assembly and the second outer layer of the lens frame assembly. The plurality of retention tabs can each be disposed within a corresponding notch in the inner layer of the lens frame assembly.

The input mechanism can include an input button disposed on the top rail and a hammer structure coupled with the top rail. The hammer structure can be configured to extend through an opening in the internal wall in response to the input button being depressed. The input mechanism can include a conductive material extending between the input button and the hammer structure. The conductive material can electrically couple the input button to the hammer structure. The input mechanism can include a foam button that is disposed on the hammer structure. The foam button can have a conductive outer surface that is electrically coupled with the input button via, at least the conductive material. The input button can be accessible through a cutout defined in the plurality of flaps.

The VR headset can include a silicone pad disposed on an inner surface of the enclosure flap.

The first structural component can be formed from a first cardboard sheet. The second structural component can be formed from a second cardboard sheet. The third structural component can be formed from a third cardboard sheet. The VR headset can be formed by folding the first cardboard sheet, the second cardboard sheet and the third cardboard sheet along a plurality of respective score lines formed thereon.

The plurality of flaps that define the opening can form at least a portion of an outer surface of the VR headset in a first configuration of the VR headset. The plurality of flaps that define the opening can be disposed within the enclosure flap in a second configuration of the VR headset.

Like reference symbols in the various drawings indicate like elements. Reference numbers for some like elements may not be repeated for all such elements. Some reference numbers for certain elements of a given implementation may not be repeated in each drawing corresponding with that implementation. Some reference numbers for certain elements of a given implementation may be repeated in other drawings corresponding with that implementation, but may not be specifically discussed with reference to each corresponding drawing.

DETAILED DESCRIPTION

This disclosure is directed to virtual reality (VR) headsets (which can also be referred to as VR goggles) that can be provided to users at a relatively low cost, as compared with other VR headset implementations. The VR headsets described herein can be used in conjunction with an electronic device that includes a display panel, such as a smartphone, a tablet, etc. VR applications or content can be executed on the electronic device, which can be inserted and secured in the VR headset, such as described herein. A user can then view images associated with (produced by) such VR applications or content that are displayed on the display panel of the electronic device using the VR headset to experience the content as virtual reality content (e.g., in a virtual 3-dimensional view).

The VR headset implementations shown in the figures and described herein are given by way of example. Accordingly, features of one implementation can be included in other implementations, where appropriate. Further, features of a given implementation can be omitted in other implementations. Also, the elements of the implementations shown in the figures and described herein are illustrative and may not be shown to scale. Further, the arrangement of the particular elements of a given apparatus can depend on the specific implementation.

In the following description, the various elements of the illustrated VR headset implementations may referenced using relative terms, such as top, left, right, bottom, etc. These terms are used by way of illustration to describe the illustrated implementations. In other implementations, or other orientations, these references may change. For instance, a left side of a VR headset in one view may be referred to as a right side in another view of that VR headset.

Additionally, elements of the VR headset implementations described herein may be referred to using enumerated references, e.g., first, second, etc. With respect to the relative references noted above, such enumerated references could change depending on the particular orientation (in a given drawing) or the particular implementation of a VR headset. For instance a first end in one view could be referred to as a second end in another view, or when discussing a different VR headset implementation.

Figure 1:
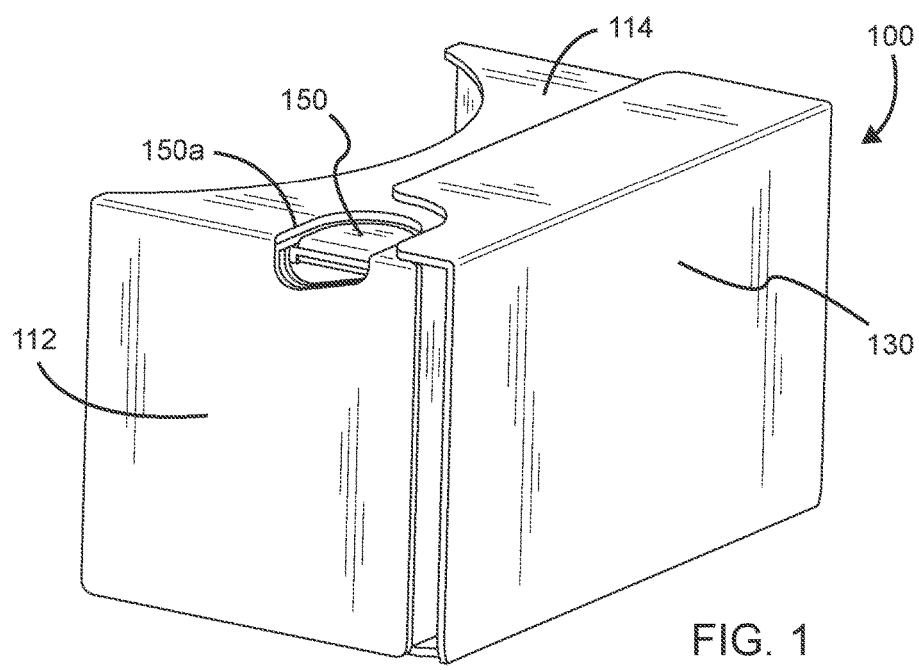
FIG. 1 is a drawing illustrating a virtual reality (VR) headset from a first perspective, according to an implementation.
Figure 2:
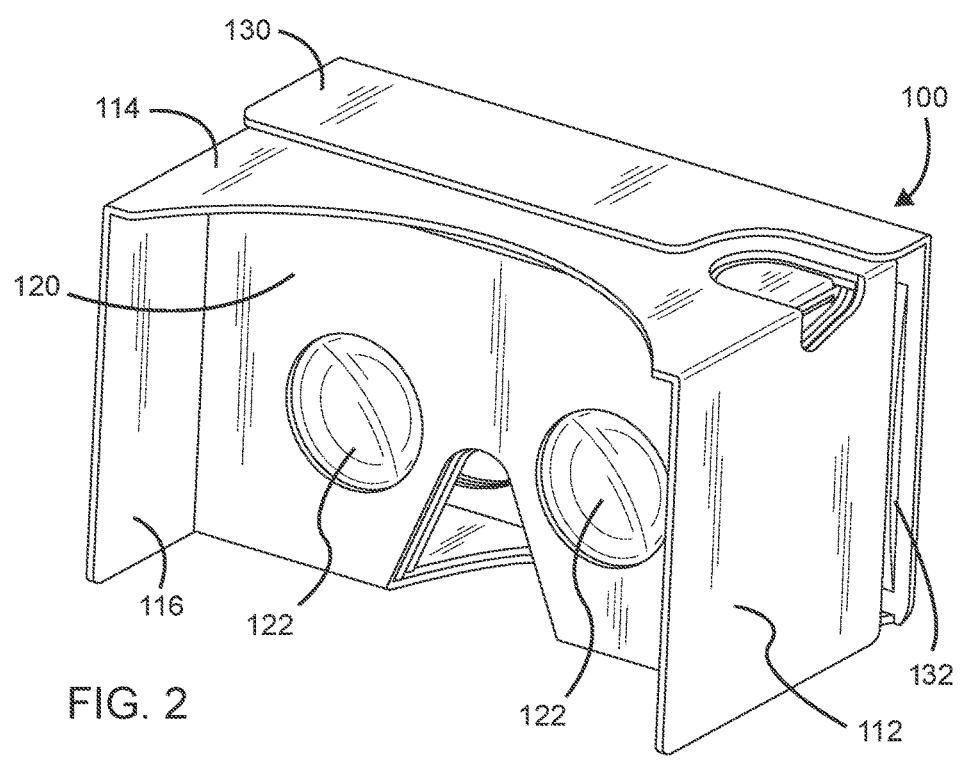
FIG. 2 is a drawing illustrating the VR headset of FIG. 1A from a second perspective, according to an implementation.

FIGS. 1 and 2 are drawings illustrating a virtual reality (VR) headset 100 from, respectively, a first perspective and a second perspective, according to an implementation. As described herein, the VR headset 100 can be produced from component parts, such as those illustrated in FIGS. 11-16, for example. Those example component parts are discussed further below. Briefly, however, those parts can include three structural components 1100, 1200 and 1400 (shown in FIGS. 11, 12 and 14, which can be formed from cardboard, or an any suitable material), a pair of aspherical lenses 122, shown in FIG. 13 (for viewing VR visual content), and components 1500 and 1600, shown in FIGS. 15 and 16, for forming an input device (in conjunction with the structural component of FIG. 14) that includes a conductive path between a user's finger and a touchscreen of an electronic device inserted in the VR headset to view VR content. Such an input device can facilitate use of a capacitive touchscreen of an electronic device to receive user input via an input button 150 on the VR headset 100.

As shown in FIGS. 1 and 2, the VR headset 100 can include a first side flap 112, a top flap 114 and a second side flap 116. The VR headset 100 can also include a front (enclosure) flap 130. In the VR headset 100, the front flap 130 can be used to a secure an electronic device (e.g., smartphone, tablet, etc.) in the VR headset when viewing VR content on the electronic device with the VR headset 100.

As shown in FIGS. 1 and 2, flaps 112, 114 and 116 can form an opening for a user to place the VR headset 100 at or near his or her face, in order to view VR content displayed on an electronic device that is inserted in the VR headset 100. For instance, as shown in FIGS. 1 and 2, the top flap 114 has a curved portion that allows a user to comfortably place the VR headset 100 over his or her eyes (e.g., against his or her forehead) when using the VR headset 100. The side flaps 112 and 116 are configured to block out external light when the VR headset 100 is placed to, or near a user's face, so as to improve the user's VR viewing experience.

The VR headset 100 can also include a lens frame assembly 120. A pair of aspherical lenses 122 suitable for viewing VR content (rendered on an electronic device) can be disposed in the lens assembly 120. In the VR headset 100, the lens assembly 120 and include (be formed from) multiple layers of material (e.g., multiple cardboard layers) which are configured to secure the aspherical lenses 122 in the lens assembly 120, such as using the approaches described herein.

A focal length of the aspherical lenses 122 can be selected based on the physical dimensions of the VR headset 100. As described herein, the lens frame assembly 120 may include a three-layer stack (e.g., three layers of die-cut cardboard), a first outer layer, an inner layer (with notches to align the lenses 122 in the lens assembly 120) and a second outer layer, each with a respective opening that allow a clear line of sight through each of the lenses 122. The two outer layers of the lens assembly may have circular lens openings that are of a same or slightly larger diameter than an optical diameter of the lenses 122, so as not to occlude a user's vision through the lenses 122. In other approaches, the lenses 122 may be mounted (affixed, etc.) in the lens frame assembly 120 using other approaches than those described herein.

As shown in FIGS. 1 and 2, the enclosure flap 130 can be hingeably coupled (e.g., at a first end of the enclosure flap 130) with a bottom side of the VR headset 100. A hinge between the enclosure flap 130 and the bottom side of the VR headset 100 can be defined as part of one (or more) of the structural components of the VR headset 100 (e.g., during an associated cutting process). As also shown in FIGS. 1 and 2, a second end of the enclosure flap 130 can be attached (e.g., removably attached using an attachment mechanism, fastening device, etc.) to a top side of the VR headset 100. In an implementation, the fastening mechanism can include a hook and loop fastening mechanism.

In the arrangement shown in FIGS. 1 and 2, the enclosure flap 130 may secure an electronic device (not shown) in the VR headset 100 with a display panel of the electronic device facing the lens frame assembly 120, so that images displayed on the electronic device (e.g., images associated with a VR application or VR content) are viewable through the aspherical lenses 122. In some embodiments, the enclosure (front) flap 130 can also include a window or aperture (not shown) that allows a camera of an electronic device that is disposed within the VR headset 100 to capture images without removing the electronic device from the VR headset 100.

The VR headset 100 can also include a pad (e.g., sticker, etc.) 132 that is disposed on inner surface of the enclosure flap 130. The pad 132 (shown in further detail in the following drawings) may be a silicone pad that has a tacky surface, where the tacky surface can prevent movement of an electronic device that is disposed within the VR headset 100 and secured in the VR headset 100 with the enclosure flap 130 (e.g., between the enclosure flap 130 and an inner wall of the VR headset). For instance, the pad 132 can contact a housing of the electronic device when secured with the enclosure flap 130.

As also shown in FIGS. 1 and 2, the VR headset 100 can include an input device (mechanism) that includes an input button 150, which is accessible through a cut out 150a in the top flap 114 and the side flap 112. An example implementation of such an input mechanism is illustrated in, at least, FIGS. 7-10 and described further below. In other implementations, the input button 150 could be located in a different location on the VR headset 100, or other input mechanisms can be used.

Figure 3:
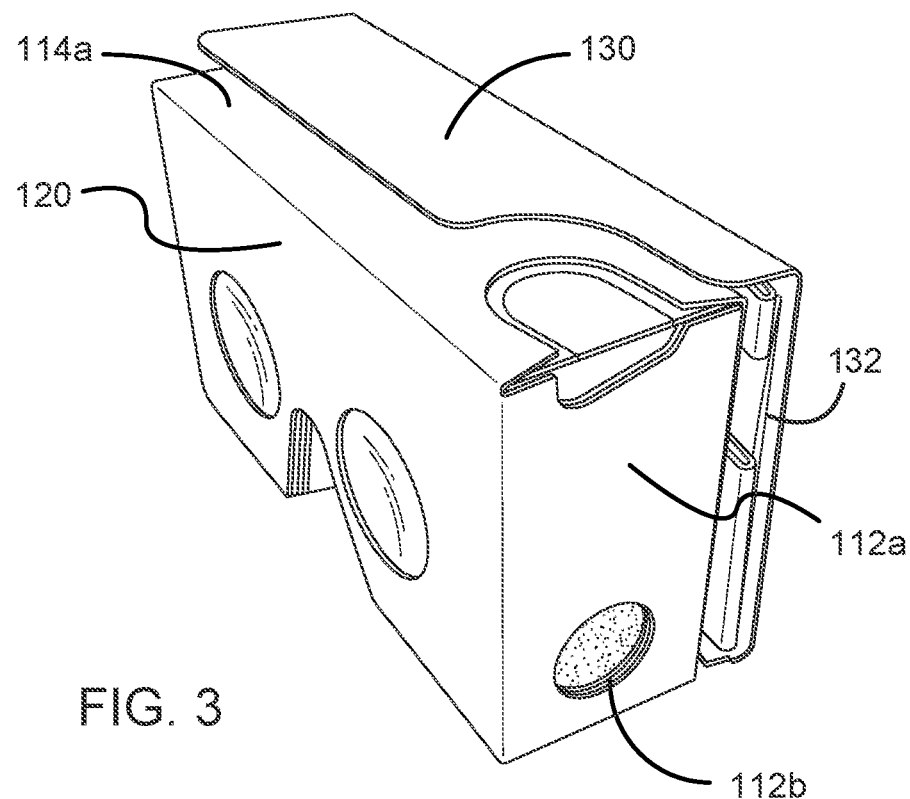
FIG. 3 is a diagram illustrating the VR headset of FIGS. 1 and 2 in a configuration suitable for shipping and transport, according to an implementation.

FIG. 3 is a diagram illustrating the VR headset 100 of FIGS. 1 and 2 in a configuration suitable for shipping and transport, according to an implementation. In the configuration of the VR headset 100 shown in FIG. 3, the flaps 112, 114 and 116 are folded and secured with the VR headset 100 by the front flap 130. The configuration of the VR headset 100 shown in FIG. 3 may be more suitable for shipping and/or transporting the VR headset 100, as it may prevent damage to the flaps 112, 114 and 116. As shown in FIG. 3, the VR headset 100 can include a first internal side 112a and an internal top 114a. The internal side 112a and the internal top (internal top side) 114a, when the VR headset is in the configuration shown in FIGS. 1 and 2, are covered, respectively, by the side flap 112 and the top flap 114. As also shown in FIG. 3, the VR headset 100 can include a hook and loop fastener 112b, which can be used to secure the side flap 112 in place when using the VR headset 100.

Figure 4:
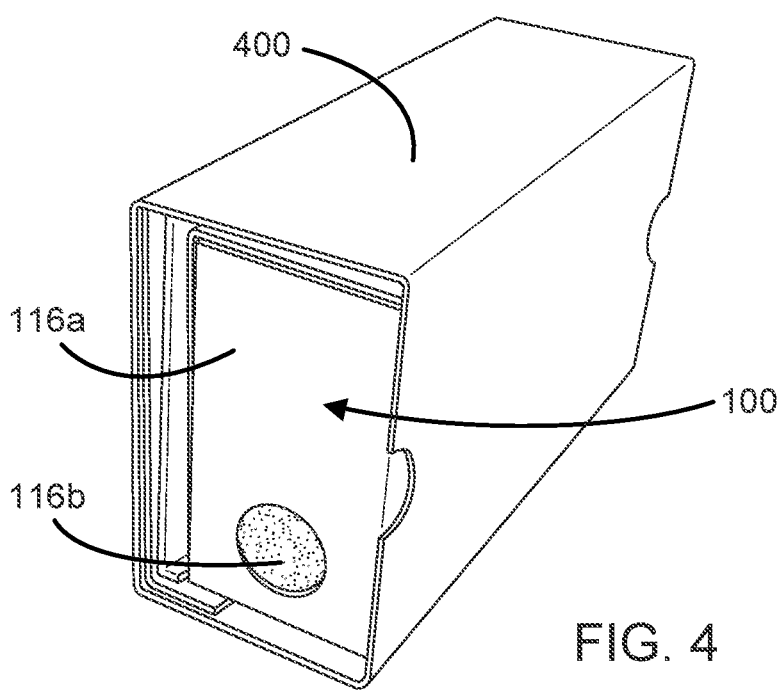
FIG. 4 is a diagram illustrating the VR headset of FIG. 3 inserted in a shipping sleeve, according to an implementation.

FIG. 4 illustrates the VR headset 100 in the configuration shown in FIG. 3, where the VR headset is inserted in a shipping sleeve 400. The shipping sleeve 400 may further protect the VR headset 100 from damage during shipping and transport. As shown in FIG. 4, the VR headset 100 can also include a second internal side 116a. The internal side 116a, when the VR headset 100 is in the configuration shown in FIGS. 1 and 2, is covered by the side flap 116. As also shown in FIG. 4, the VR headset 100 can include a hook and loop fastener 116b, which can be used to secure the side flap 116 in place when using the VR headset 100 (e.g., in the configuration shown in FIGS. 1 and 2).

Figure 5:
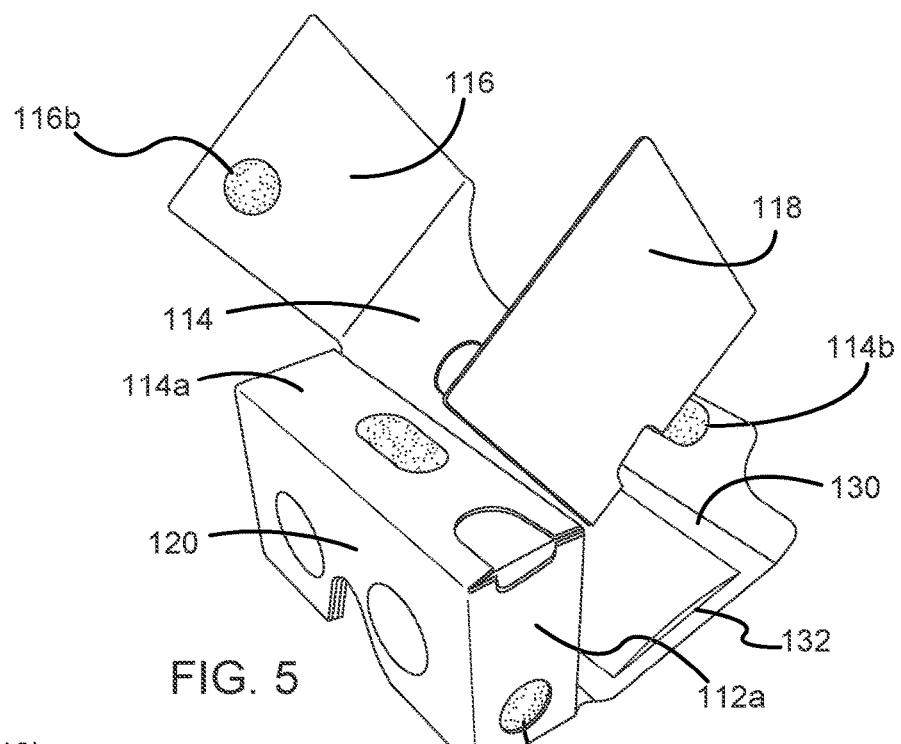
FIGS. 5 and 6 is are diagrams illustrating a process of changing the configuration of the VR headset as shown in FIGS. 1 and 2 to the configuration of the VR headset as shown in FIG. 3, according to an implementation.
Figure 6:
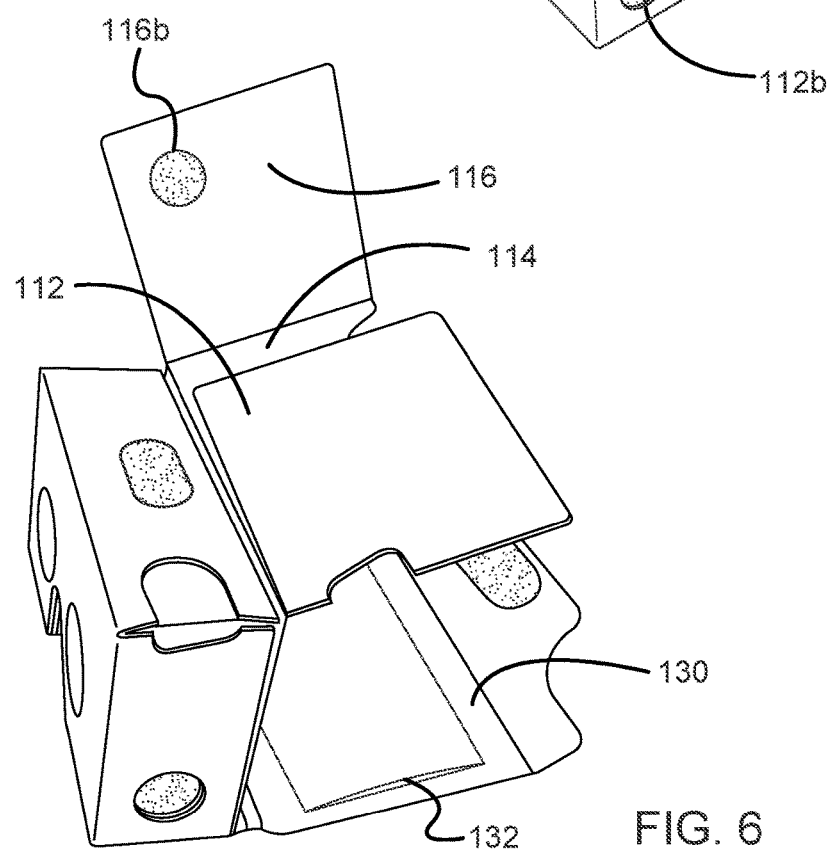

FIGS. 5 and 6 are diagrams illustrating a process of changing a configuration of the VR headset 100 as it is shown in FIGS. 1 and 2 to the configuration of the VR headset 100 as it is shown in FIG. 3, according to an implementation. As shown in FIG. 5, the side flaps 112 and 116 and the top flap 114 of the VR headset 100 have been detached from, respectively, the internal side 112a, the internal side 116a and the internal top 114a of the VR headset 100, e.g., by detaching corresponding fastening mechanisms (e.g., hook and loop fasteners). As shown in FIG. 5, the VR headset 100 can include a hook and loop fastener 114b, which can be used to secure the front flap 130 in place when using the VR headset 100, where the enclosure (front) flap 130, in turn holds the top flap 114 in place in the configuration of the VR headset 100 shown in FIGS. 1 and 2.

FIG. 5 also further illustrates the arrangement of the pad 132 on the inner surface of the enclosure flap 130. In certain implementations As shown in FIG. 6, progressing from the arrangement of the VR headset 100 shown in FIG. 5, the side flaps 112 and 116 can be folded over onto the top flap 114. Then the flaps 112, 114 and 116 can all be folded downward and secured inside the VR headset 100 by the front flap 130.

Figure 7:
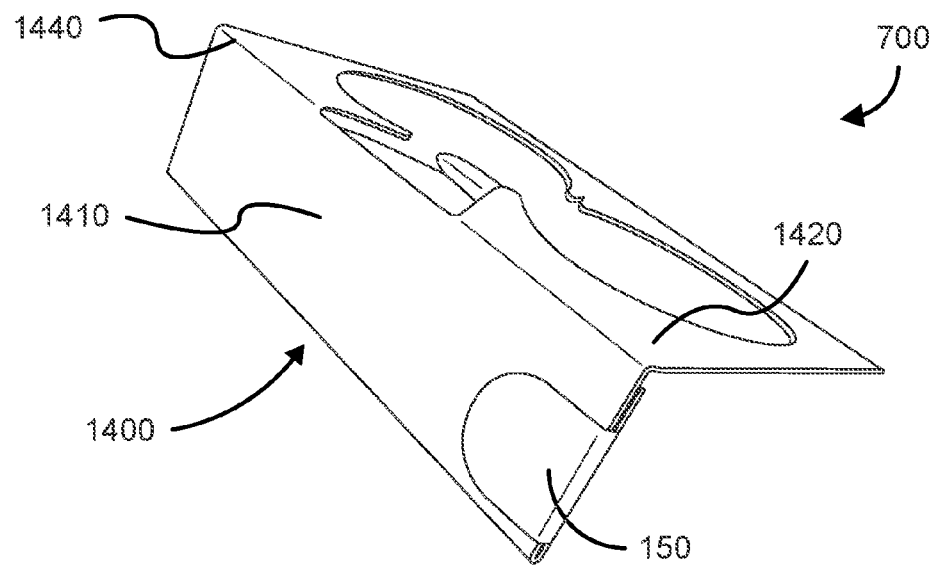
FIGS. 7 and 8 are diagrams illustrating an input mechanism of the VR headset of FIGS. 1-6, according to an implementation.
Figure 8:
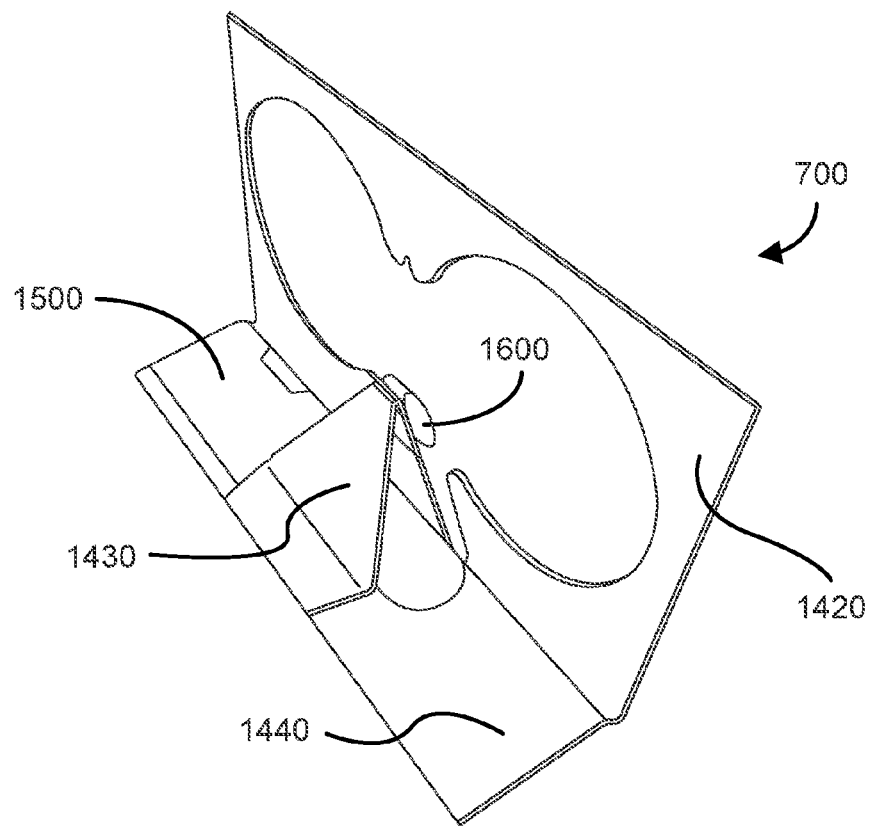

FIGS. 7 and 8 are diagrams illustrating an input button mechanism 700 of the VR headset 100 of FIGS. 1-6, according to an implementation. For purposes of illustration, the input button mechanism 700 is shown separate from the VR headset 100 in FIGS. 7 and 8. When in use in the VR headset 100, the input button mechanism 700 would be disposed within the VR headset 100, with the input button 150 of the input button mechanism 700 being accessible through the cut out in the side flap 112, the internal side 112a, the top flap 114 and the internal top 114a.

Figure 14:
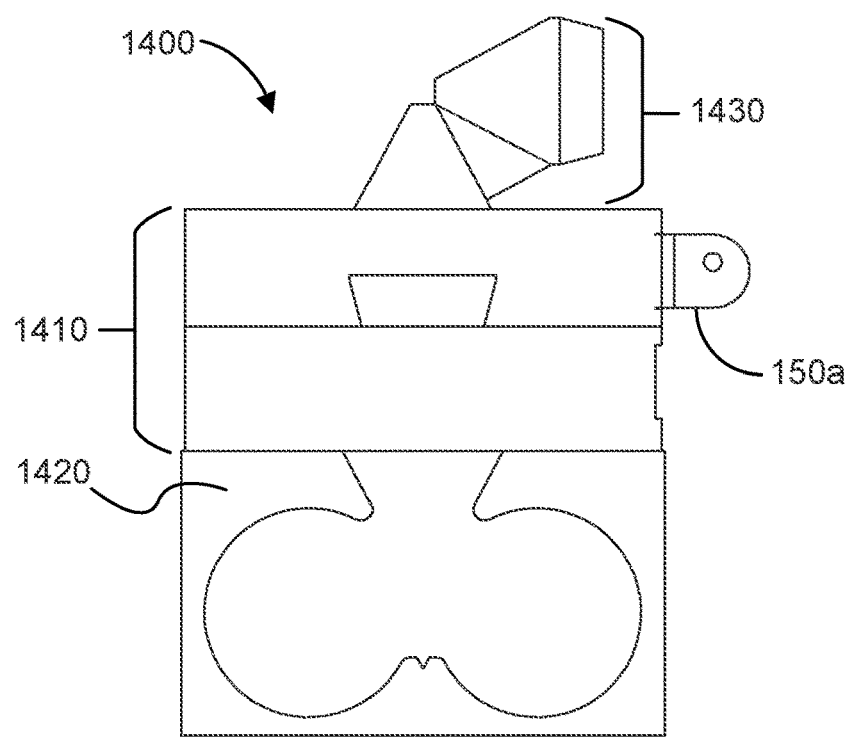

As shown in FIGS. 7 and 8, the input button mechanism 700 can include a structural component (an input button portion 1400), which is illustrated in a plan view in FIG. 14. The structural component 1400 can include a top rail 1410, an internal wall portion 1420, a hammer structure 1430 and a hinge corner 1440. In such an approach, when the input button 150 of the input button mechanism 700 is pushed in the VR headset 100, the hinge corner 1440 allows the top rail 1410 to move (e.g., pivot) such that the hammer structure 1430 can move (e.g., rotate, pivot, etc.) toward, and make contact with, a touchscreen of an electronic device (e.g., through the illustrated opening in the internal wall portion 1420) that is disposed in the VR headset 100.

Figure 15:
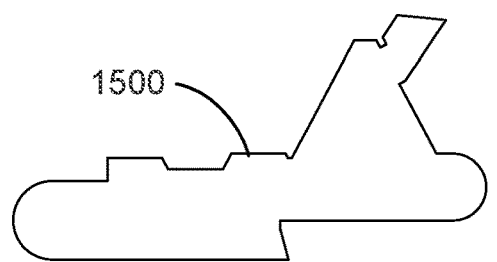
Figure 16:
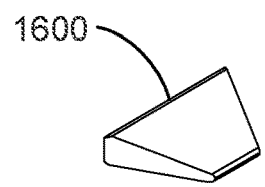

As shown in FIGS. 7 and 8, the input button mechanism 700 can also include a conductive strip 1500 (which is illustrated in FIG. 15) and a foam button or wedge 1600 (which is illustrated in FIG. 16). In some implementations, the foam button 1600 can be conductive, while in other implementations the foam button 1600 can be wrapped in a conductive material. The conductive strip 1500 and the foam button 1600 can form a conductive path from the input button 150 to the touchscreen of an electronic device disposed in the VR headset 100 when the foam button 1600 comes in contact with the touchscreen. Accordingly, the input button mechanism 700 may allow a user to interact with an electronic device that is disposed in the VR headset 100 by using the input button 150 while viewing VR content on the electronic device with the VR headset 100.

Figure 9:
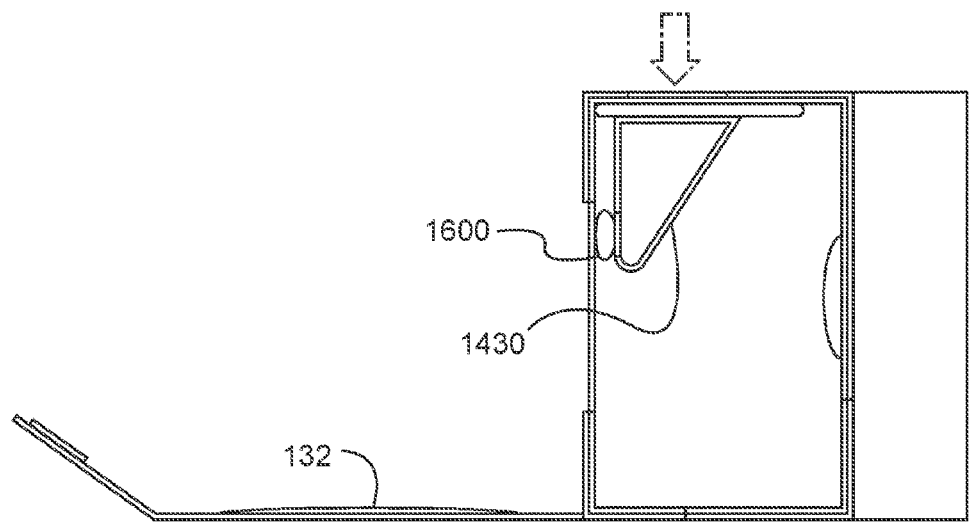
FIGS. 9 and 10 are cross-sectional diagrams illustrating operation of the VR headset input mechanism of FIGS. 7 and 8, according to an implementation.
Figure 10:
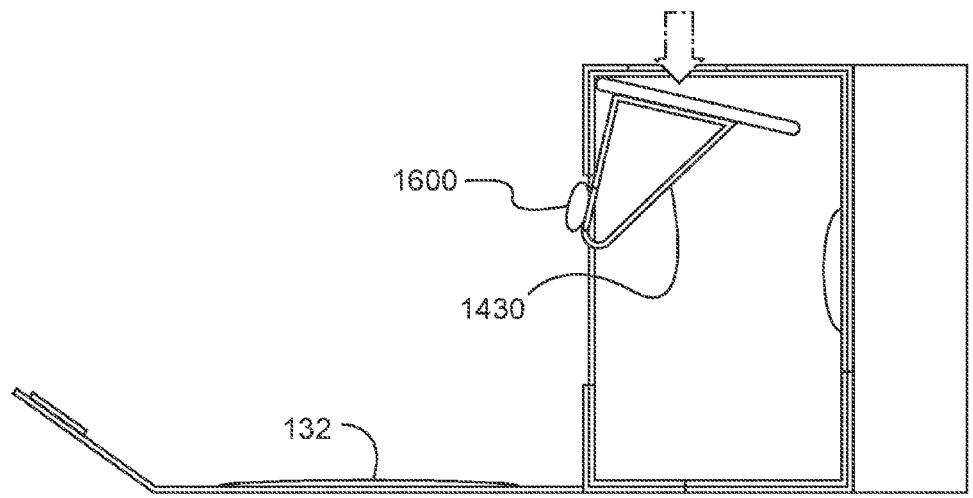

FIGS. 9 and 10 are cross-sectional diagrams illustrating operation of the VR headset input mechanism of FIGS. 7 and 8, according to an implementation. FIG. 9 shows the orientation of the input button mechanism 700 when the input button 150 has not yet been depressed. As shown in FIG. 9, the hammer structure 1430 and the foam button 1600 are disposed within the internal wall portion 1420 of the input button mechanism. FIG. 10 shows the orientation of the input button mechanism 700 with the input button 150 having been depressed. As shown in FIG. 10, top rail 1410 has rotated (pivoted, hingeably moved, and so forth) at the hinge corner 1440, which results in the hammer structure 1430 and the foam button 1600 having moved to the left and passed through the internal wall structure 1420 of the VR headset 100. In use, this can result in the foam button 1600 making contact with a touchscreen of an electronic device inserted into VR headset, which, due to the conductive path between the input button 150 (which is covered by the conductive strip 1500) and the foam button 1600, can facilitate a user interacting with the electronic device using the input button 150.

Figure 11:
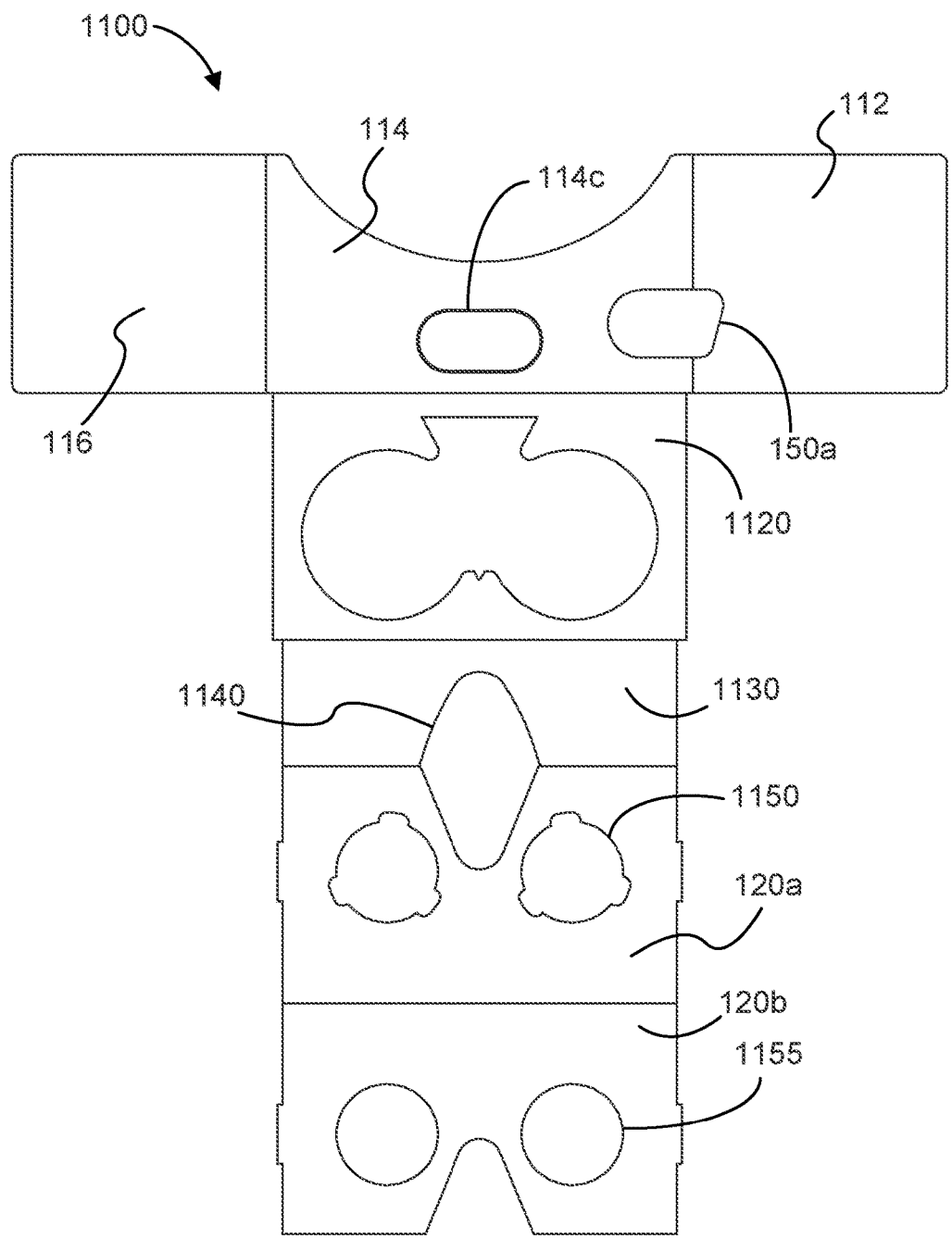
FIGS. 11-16 are diagrams illustrating component parts of the VR headset of FIGS. 1-8, according to an implementation.
Figure 12:
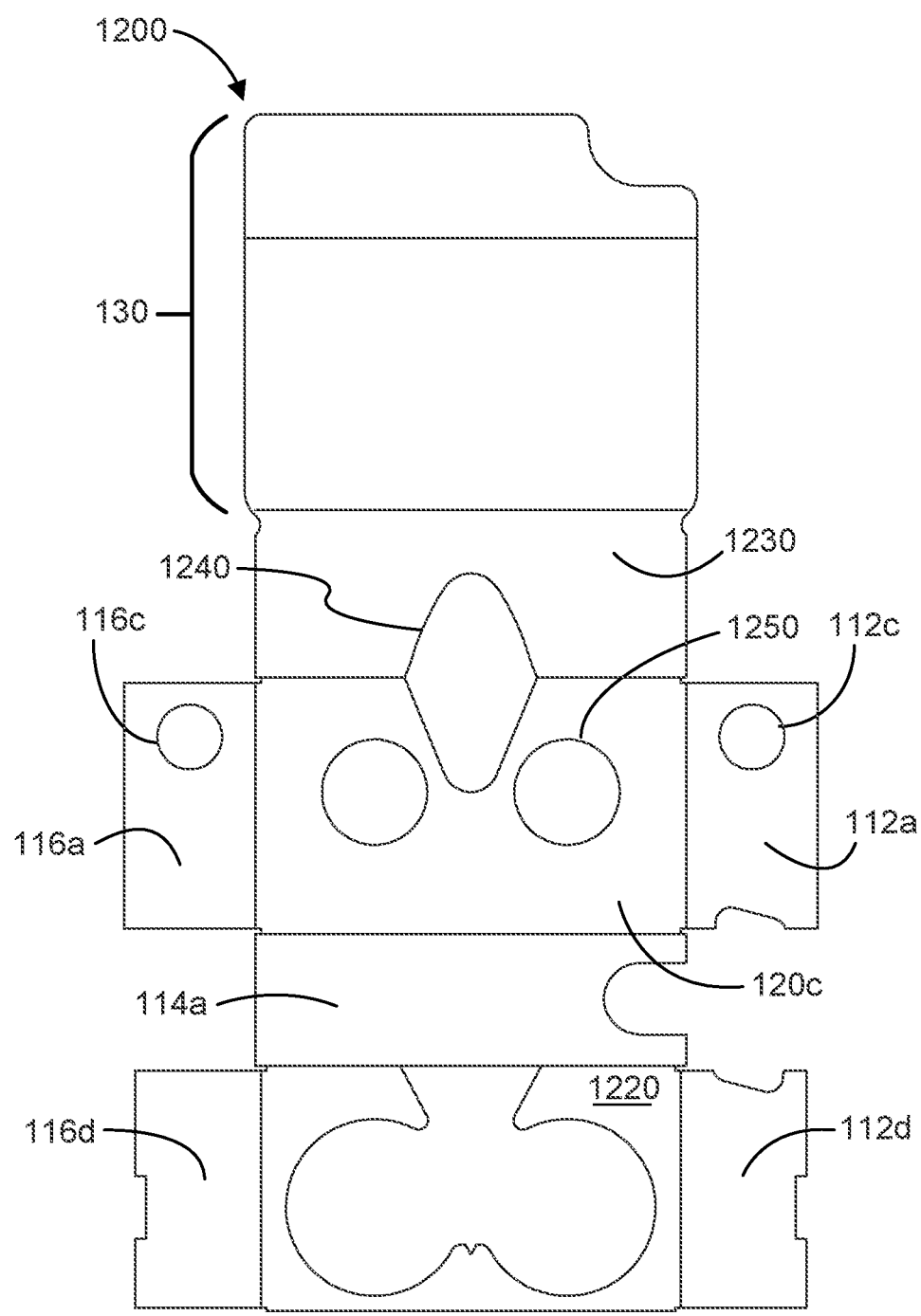
Figure 13:
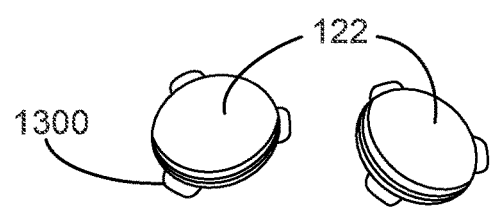

FIGS. 11-16 are diagrams illustrating component parts of the VR headset of FIGS. 1-8, according to an implementation. Assembly of the component parts shown in FIGS. 11-16 to produce the VR headset 100 is illustrated by FIGS. 17-26 and described below. As shown in FIGS. 11, 12 and 13, the structural components illustrated in those figures can include a plurality of score lines. The VR headset 100 can be formed (such as shown in FIGS. 17-26) by folding those structural components along those score lines.

FIG. 11 illustrates a first structural component that can be used to produce the VR headset 100. The structural component of FIG. 11 can be referred to as a flap portion of the VR headset 100, as it includes the side flaps 112 and 116, and also includes the top flap 114. As shown in FIG. 11 the flap portion 1100 can also include an opening 114c that can be used to align a fastening mechanism (e.g., a hook and loop fastening mechanism) that can be used to secure the front flap 130 of the VR headset 100 to a top side of the headset, such as shown in FIGS. 1 and 2, for example. The flap portion 1100 can also include an opening 150a that is defined in the top flap 114 and the side flap 112, where the opening 150a can provide access to the input button 150 of the input button mechanism 700 of the VR headset 100.

As illustrated in FIG. 11, the flap portion 1100 can also include an internal wall portion 1120 (e.g., a first internal wall portion) and a bottom portion 1130 that can form part of the internal structure of the VR headset 100. The flap portion 1100 can also include a nose cutout 1140 configured to go over a user's nose. The flap portion 1100 can further include an inner wall portion 120a of the lens assembly 120 and a first outer wall portion 120b of the lens assembly 120. The inner wall portion 120a can have lens openings 1150 defined therein, where the lens openings 1150 include notches that can be used (e.g., in conjunction with tabs included on the aspherical lenses 122) to align the aspherical lenses 122 properly in the lens assembly 120. Likewise, the outer wall portion 120b can have circular lens openings 1155 defined therein, where the lens openings 1155 are sized so as not to occlude the aspherical lenses 122 or obstruct a user's line of sight through the aspherical lenses 122.

FIG. 12 illustrates a second structural component that can be used to produce the VR headset 100. The structural component shown in FIG. 12 can be referred to as a chassis portion 1200 of the VR headset 100. As shown in FIG. 12, the chassis portion 1200 can include the front flap 130 of the VR headset 100. The chassis portion 1200 can also include an internal wall portion 1220 (e.g., a second internal wall portion) and a bottom portion 1230 that can form part of the internal structure of the VR headset 100 with corresponding portions of the flap portion 1100. The chassis portion 1200 can also include a nose cutout 1240 configured (in alignment with the nose cutout 1140) to go over a user's nose when using the VR headset 100.

As shown in FIG. 12, the chassis portion 1200 can also include the internal side 112a, the internal top 114a and the internal side 116a. The internal side 112a can include an opening 112c, and the internal side 116a can include an opening 116c, where the openings 112c and 116c can be used to align respective fastening mechanisms (e.g., a hook and loop fastening mechanisms) that can be used to secure the side flaps 112 and 116 to the internal structure of the VR headset 100, such as shown in FIGS. 1 and 2, for example. The chassis portion 1200 can also include a flap 112d, which can be folded under internal side 112a, with internal side 112a being affixed to the flap 112d, such as shown in FIG. 3. Likewise, the chassis portion 1200 can also include a flap 116d, which can be folded under internal side 116a, with internal side 116a being affixed to the flap 116d, such as shown in FIG. 4.

The chassis portion 1200 can further include a second outer wall portion 120c of the lens assembly 120. The second outer wall portion 120c, like the first outer wall portion 120b included in the flap portion 1100, can have circular lens openings 1250 defined there. As with the lens openings 1155 of the flap portion 1100, the lens openings 1250 of the chassis portion 1200 can be sized so as not to occlude the aspherical lenses 122 or obstruct a user's line of sight through the aspherical lenses 122. In the VR headset 100, the second outer wall 120c of the lens assembly 120 can be affixed to the internal wall portion 120a of the lens assembly 120, which can fixedly secure the aspherical lenses 122 (by covering their tabs) in place in the lens assembly 120.

FIG. 13 illustrates the aspherical lenses 122 of the VR headset 100. As shown in FIG. 13, the aspherical lenses 122 can each include a plurality of tabs that are configured to align with the tabs of the lens openings 1150 of the inner wall portion 120*a* of the lens assembly 120, which are shown in FIG. 11.

FIG. 14 illustrates a third structural component that can be used to produce the VR headset 100, the input button mechanism portion 1400 of the input button mechanism 700 illustrated in FIGS. 7-10. As shown in FIG. 14, the input button mechanism portion 1400 can include the top rail 1410 (e.g., in two sections that can be folded over on each other) of the input button mechanism 700, an internal wall portion 1420 (e.g., a third internal wall portion) and the hammer portion 1430 (which can be folded to form the hammer portion 1430 as it is illustrated in FIG. 8, for example).

The conductive strip 1500 and the foam button 1600 (shown in FIGS. 15 and 16, respectively) can be affixed to the input button mechanism portion 1400 as part of the assembly process illustrated in FIGS. 17-26. The input button mechanism portion 1400 can also include a button portion 150*a*, that can be folded over onto (and affixed with) the top rail 1410 and then covered with a portion of the conductive strip 1500 to form the input button 150.

FIG. 15 illustrates the conductive strip 1500 and FIG. 16 illustrates the foam button 1600 that can be included in the input button mechanism 700 that was illustrated in FIGS. 7-10 and described above. The materials used to produce the conductive strip 1500 and the foam button 1600 can vary, and will depend on the particular implementation.

Figure 17:
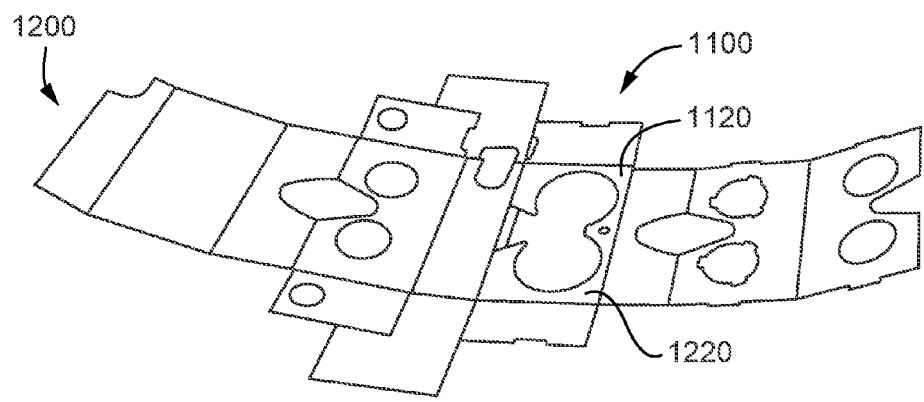
FIGS. 17-26 are diagrams illustrating assembly steps for producing the VR headset of FIGS. 1-6 from the component parts of FIGS. 11-16, according to an implementation.
Figure 18:
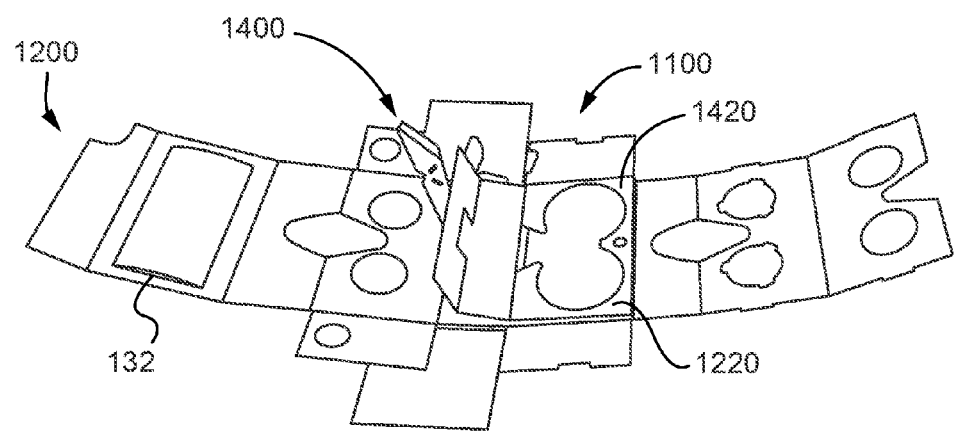

FIG. 17-26 are diagrams illustrating assembly steps for producing the VR headset 100 of FIGS. 1-6 from the component parts 1100, 1200, 122, 1400, 1500 and 1600 illustrated in FIGS. 11-16, according to an implementation. FIG. 17 shows the chassis portion 1200 of FIG. 12 affixed to (on top of) the flap portion 1100 of FIG. 11, where the internal wall section 1220 of the chassis portion 1200 is aligned with the internal wall section 1120 of the flap portion 1100. FIG. 18 shows the input button portion 1400 of FIG. 14 affixed to (on top of) the flap portion 1100 and the chassis portion 1200, where the chassis portion 1200 is disposed at least in part, between the flap portion 1100 and the input button portion 1400, and the internal wall section 1420 of the input button portion 1400 is aligned and affixed with be in internal wall section 1220 of the chassis portion 1200. FIG. 18 also shows the pad 132 (e.g., silicone pad) affixed to the inner surface of the enclosure flap 130. For instance, the pad 132 can have an adhesive backing that is used to affix it in place in the VR headset. Alternatively, an adhesive could be applied to the inner surface of the enclosure flap 130 and that adhesive used to affix the pad 132 in place in the VR headset 100.

Figure 19:
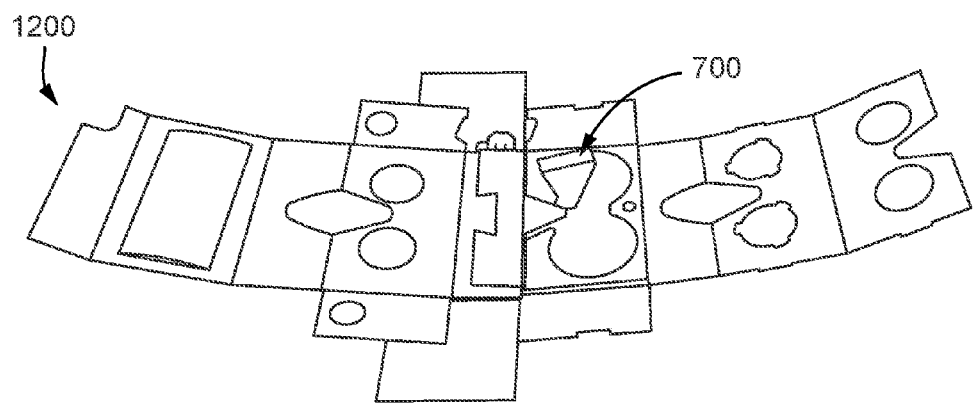
Figure 20:
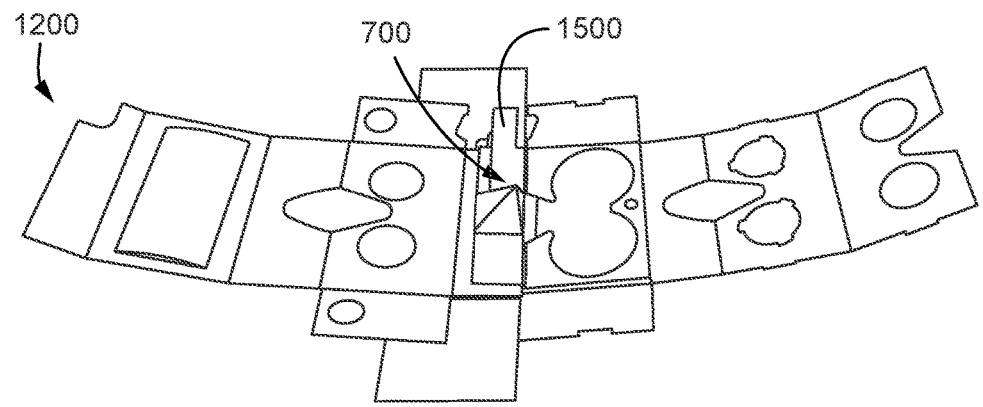
Figure 21:
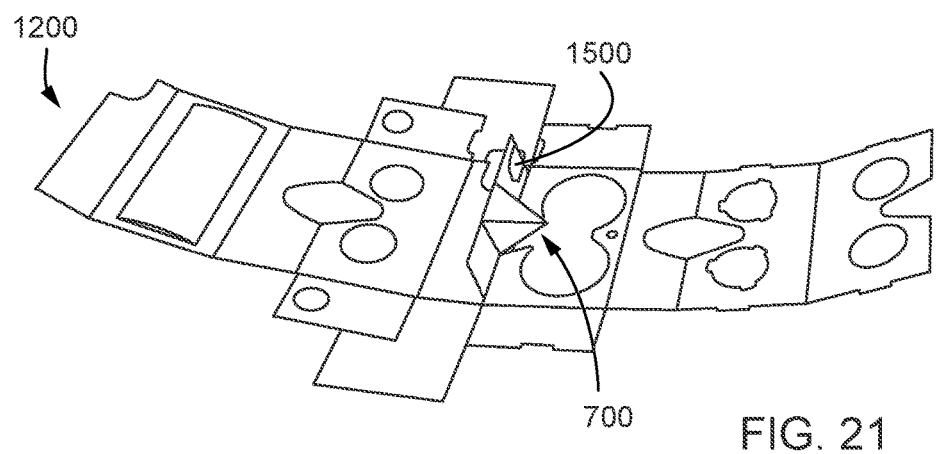

FIGS. 19, 20 and 21 illustrate assembly of the input button mechanism 700 shown in FIGS. 7 and 8, and in cross-section in FIGS. 9 and 10, including application of the conductive strip 1500 of FIG. 15.

Figure 22:
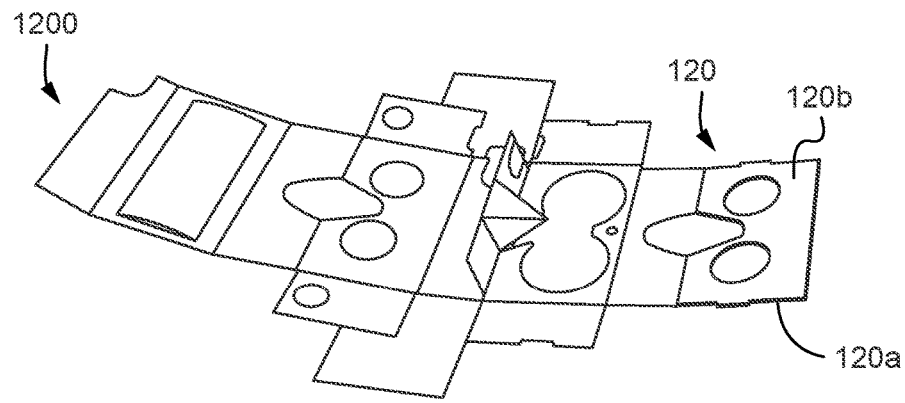
Figure 23:
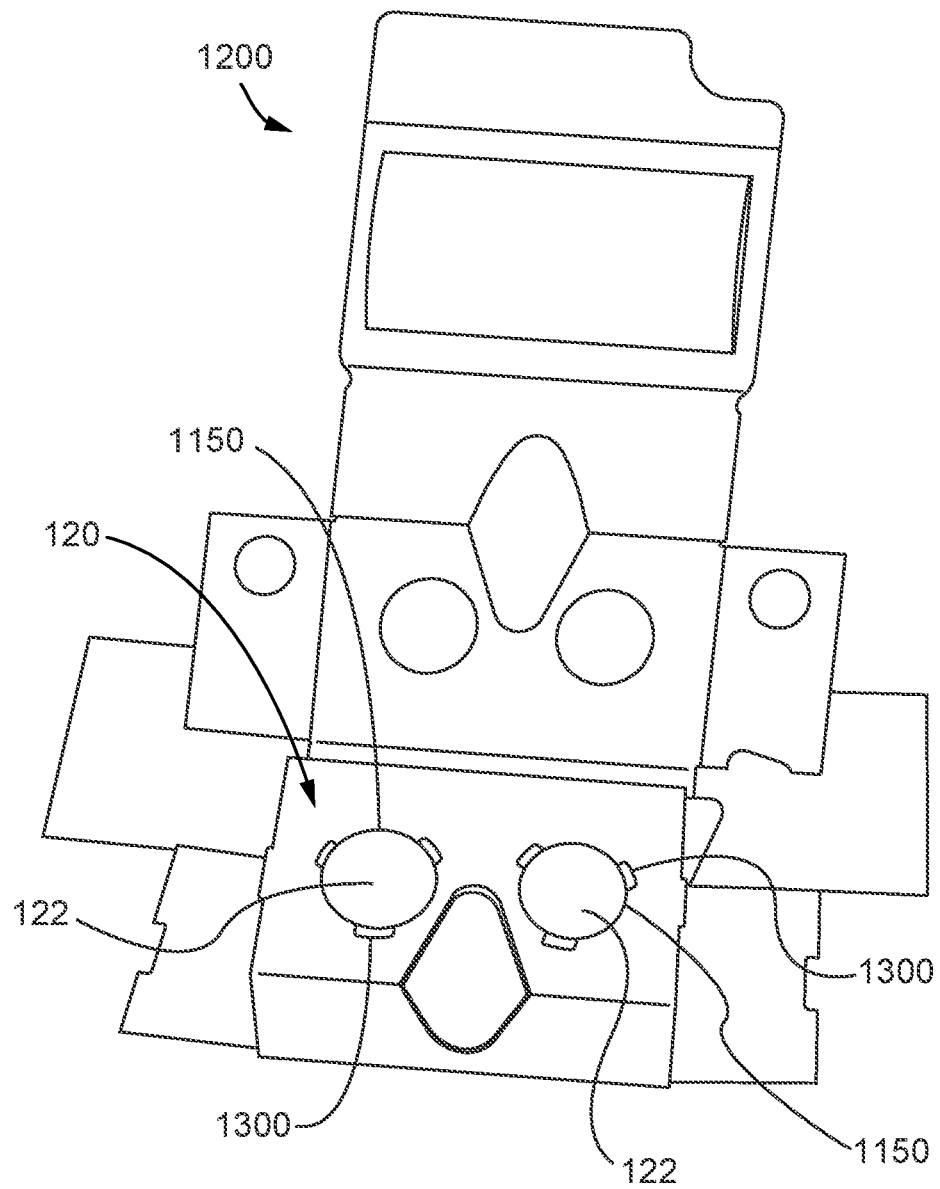
Figure 24:
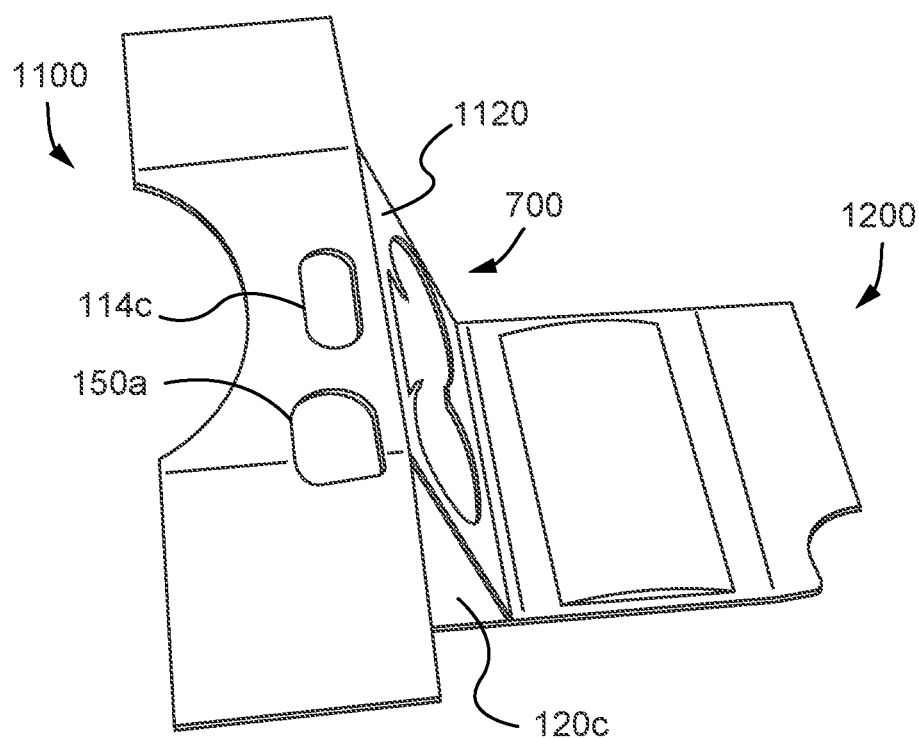

FIG. 22 shows the outer wall 120*b* of the lens assembly 120 folded over on and affixed with the inner wall 120*a* of the lens assembly 120. FIG. 23 shows the aspherical lenses 122 placed in the lens assembly 120, with the tabs 1300 of the aspherical lenses 122 aligned with the notches of the lens openings 1150 of the inner wall 120*a* of the lens assembly 120. FIG. 24 illustrates folding over the flap portion 1100 onto the chassis portion 1120 to secure the aspherical lenses 122 in the lens frame assembly by affixing the outer wall 120*c* with the inner wall 120*a*, which secures the tabs 1300 in the notches of the lens openings 1150 of the inner wall 120*a* and encloses the input button mechanism 700 in the VR headset 100.

Figure 25:
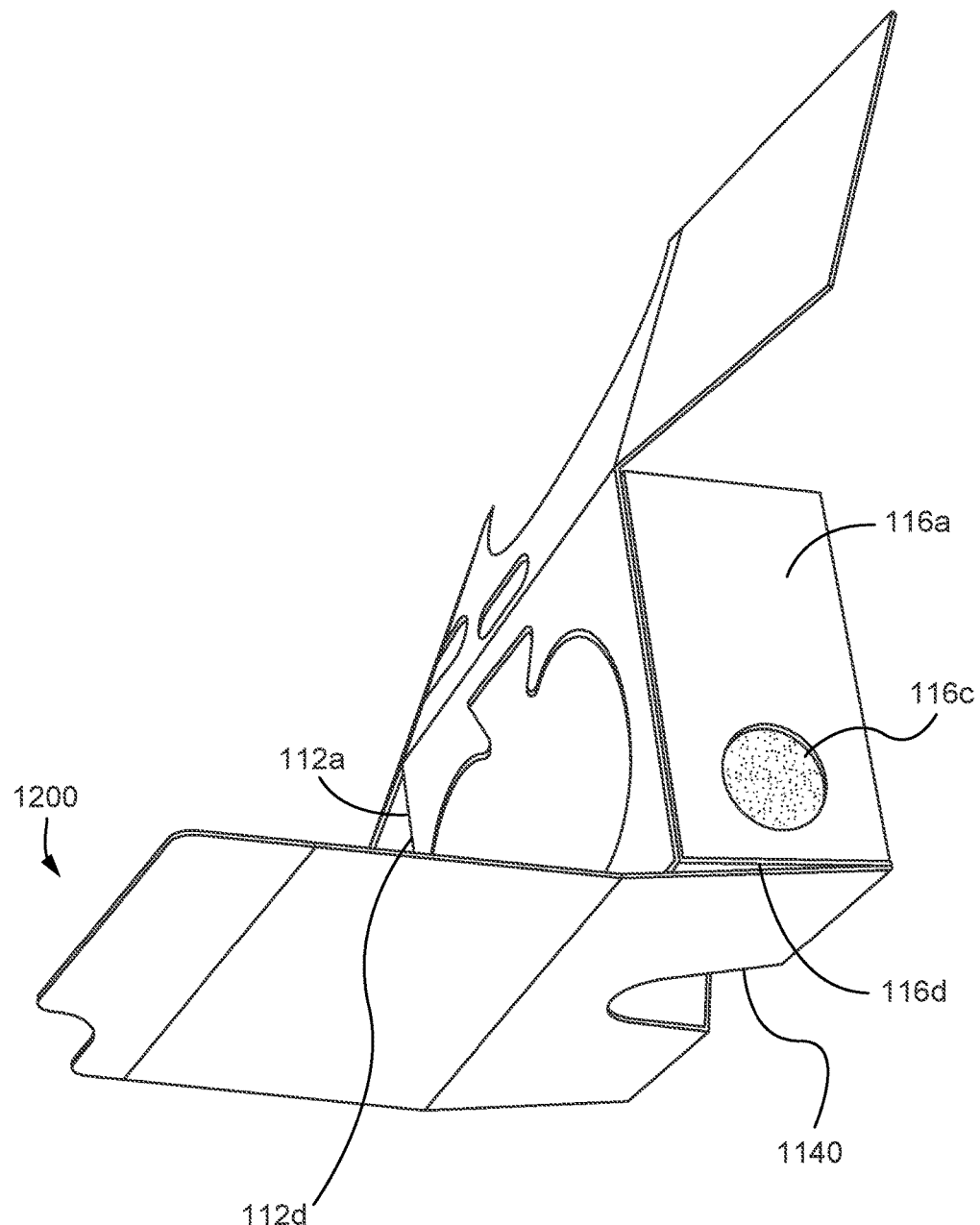
Figure 26:
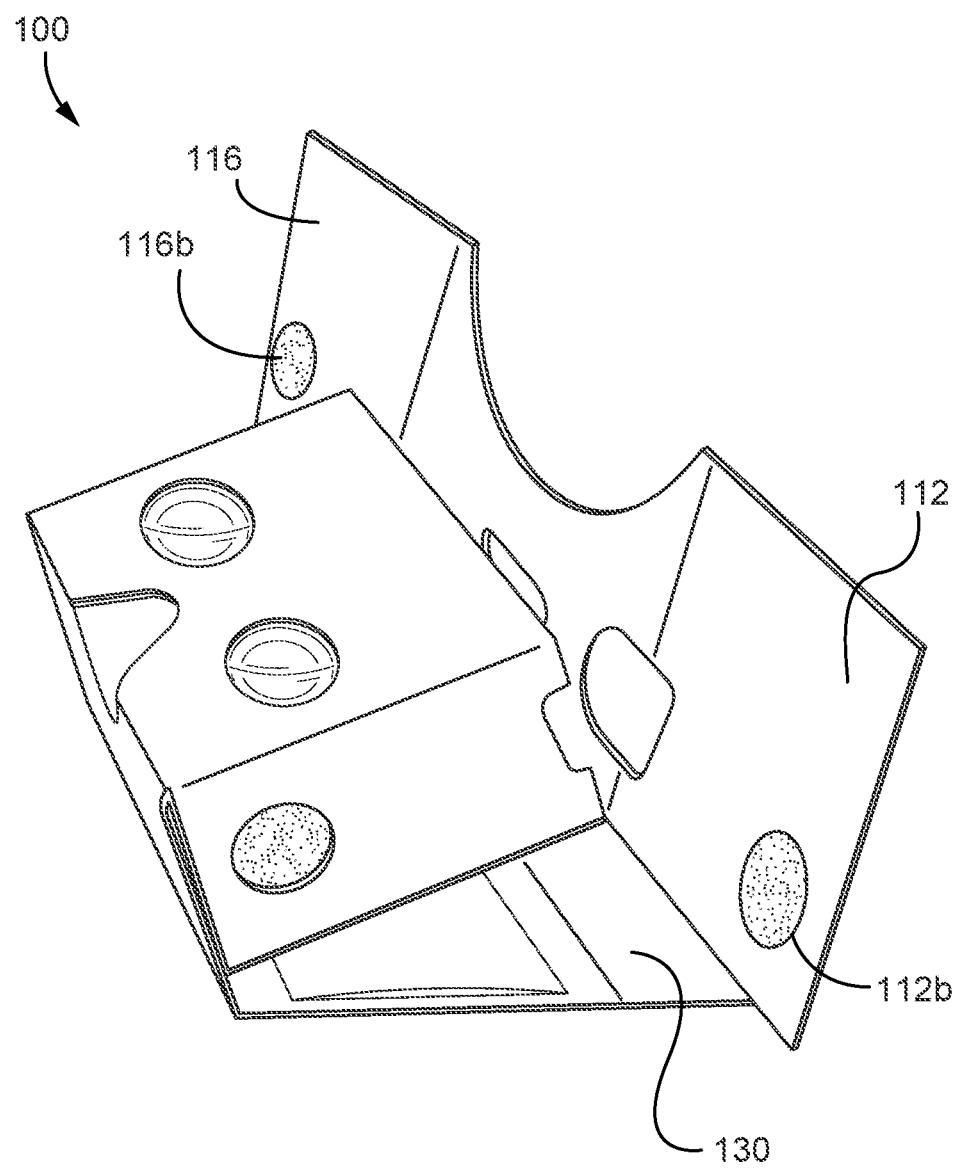

FIG. 25 shows the flap 116*d* of the chassis portion 1200 folded in and inner wall 116*a* folded over on top of (and affixed to) the flap 116*d*. The hook and loop alignment hole 116*c* is also shown in FIG. 25. The flap 112*d* and the inner wall 112*a* can be similarly assembled. FIG. 26 shows the VR headset 100 after affixing the hook and loop fasteners for the side flaps 112 and 116, as well the hook and loop fastener for the front flap 130. The VR headset 100, as shown in FIG. 26, is ready for use after securing the side flaps 112 and 116 using their hook and loop fasteners 112*b* and 116*b*, and securing an electronic device in the VR headset with the front flap 130 and its corresponding hook and loop fastener 114*b* (shown in FIG. 5).

In a general aspect, a virtual reality headset can include a plurality of structural components, where each structural component can be formed from a respective cardboard sheet. The plurality of structural components being folded to form the VR headset. The plurality of structural components can include a plurality of flaps that define an opening for placement of the VR headset near or against a face of a user in a first configuration of the VR headset, an internal wall of the VR headset, a bottom wall of the VR headset, a lens frame assembly, a top wall of the VR headset and an enclosure flap hingeably coupled with the bottom wall of the VR headset. The enclosure flap can be configured, in the first configuration of the VR headset, to secure an electronic device in the VR headset against the internal wall. In a second configuration of the VR headset, the enclosure flap can be configured to enclose the plurality of flaps that define the opening between the internal wall and the enclosure flap.

Implementations can include one or more of the following features. For instance, the plurality of structural components can include a top rail hingeably connected to the internal wall. The top rail can be disposed within the VR headset and include an input mechanism. The input mechanism can include an input button disposed on the top rail and a hammer structure coupled with the top rail. The hammer structure can be configured to extend through an opening in the internal wall in response to the input button being depressed. The input mechanism can include a conductive material extending between the input button and the hammer structure. The conductive material can electrically couple the input button to the hammer structure.

The VR headset can include a pair of aspherical lenses disposed in the lens frame assembly such that images displayed on a display panel of the electronic device disposed in the VR headset against the internal wall of the VR headset are viewable through the pair of aspherical lenses. The VR headset can include a silicone pad disposed on an inner surface of the enclosure flap.

The plurality of flaps can include a first side flap, a second side flap and a top flap disposed between the first side flap and the second side flap. The top flap can have a curved cutout configured to be place against or near a forehead of a user. In the first configuration of the VR headset, the first side flap can be fastened to a first internal side wall of the VR headset and the second side flap can be fastened to a second internal side wall of the VR headset. In the first configuration of the VR headset and in the second configuration of the VR headset, the enclosure flap can be fastened to an internal top wall of the VR headset.

In another general aspect, a virtual reality (VR) headset can include a first structural component, a second structural component and a third structural component. The first structural component can include a plurality of flaps that define an opening for placement of the VR headset near or against a face of a user, a first portion of an internal wall of the VR headset, a first portion of a bottom wall of the VR headset, an inner layer of a lens frame assembly and a first outer layer of the lens frame assembly. The second structural component can include a second portion of the internal wall of the VR headset. The second portion of the internal wall can be fixedly attached to the first portion of the internal wall. The second structural component can further include a top wall of the VR headset, a second outer layer of the lens frame assembly a second portion of the bottom wall of the VR headset and an enclosure flap hingeably coupled with the second portion of the bottom wall of the VR headset. The enclosure flap can be configured to secure an electronic device in the VR headset and against the internal wall. The third structural component can include a third portion of the internal wall of the VR headset. The third portion of the internal wall can be fixedly attached to the second portion of the internal wall. The third structural component can also include a top rail with an input mechanism. The top rail can be hingeably connected to the third portion of the internal wall.

Implementations can include one or more of the following features. For instance, the plurality of flaps can include a first side flap, a second side flap and a top flap disposed between the first side flap and the second side flap. The top flap can have a curved cutout configured to be placed against or near a forehead of a user. The first side flap, the second side flap and the top flap can be foldable such that they are disposed between the internal wall and the enclosure flap.

The VR headset can include a pair of aspherical lenses disposed in the lens frame assembly such that images displayed on a display panel of an electronic device disposed in the VR headset between the enclosure flap the internal wall of the VR headset are viewable through the pair of aspherical lenses. An aspherical lens of the pair of aspherical lenses can be disposed within a lens opening defined in the inner layer of the lens frame assembly and held in place by a plurality of retention tabs disposed around a perimeter of the aspherical lens. The plurality of retention tabs can be disposed between the first outer layer of the lens frame assembly and the second outer layer of the lens frame assembly. The plurality of retention tabs can each be disposed within a corresponding notch in the inner layer of the lens frame assembly.

The input mechanism can include an input button disposed on the top rail and a hammer structure coupled with the top rail. The hammer structure can be configured to extend through an opening in the internal wall in response to the input button being depressed. The input mechanism can include a conductive material extending between the input button and the hammer structure. The conductive material can electrically couple the input button to the hammer structure. The input mechanism can include a foam button that is disposed on the hammer structure. The foam button can have a conductive outer surface that is electrically coupled with the input button via, at least the conductive material. The input button can be accessible through a cutout defined in the plurality of flaps.

The VR headset can include a silicone pad disposed on an inner surface of the enclosure flap.

The first structural component can be formed from a first cardboard sheet. The second structural component can be formed from a second cardboard sheet. The third structural component can be formed from a third cardboard sheet. The VR headset can be formed by folding the first cardboard sheet, the second cardboard sheet and the third cardboard sheet along a plurality of respective score lines formed thereon.

The plurality of flaps that define the opening can form at least a portion of an outer surface of the VR headset in a first configuration of the VR headset. The plurality of flaps that define the opening can be disposed within the enclosure flap in a second configuration of the VR headset.

A number of implementations have been described. Nevertheless, it will be understood that various modifications may be made without departing from the spirit and scope of the following claims.

What is claimed is:

1. A virtual reality (VR) headset comprising:
    a plurality of structural components, each structural component being formed from a respective cardboard sheet, the plurality of structural components being folded to form the VR headset, the plurality of structural components including:
        a plurality of flaps that define an opening for placement of the VR headset near or against a face of a user in a first configuration of the VR headset;
        an internal wall of the VR headset;
        a bottom wall of the VR headset;
        a lens frame assembly, the plurality of flaps at least partially enclosing the lens frame assembly in the first configuration of the VR headset;
        a top wall of the VR headset; and
        an enclosure flap hingeably coupled with the bottom wall of the VR headset, the enclosure flap being configured, in the first configuration of the VR headset, to secure an electronic device in the VR headset against the internal wall and, in a second configuration of the VR headset, to enclose the plurality of flaps between the internal wall and the enclosure flap.

2. The VR headset of claim 1, wherein the plurality of structural components further include a top rail hingeably connected to the internal wall, the top rail being disposed within the VR headset and including an input mechanism.

3. The VR headset of claim 2, wherein the input mechanism includes:
    an input button disposed on the top rail;
    a hammer structure coupled with the top rail, the hammer structure being configured to extend through an opening in the internal wall in response to the input button being depressed; and
    a conductive material extending between the input button and the hammer structure, the conductive material electrically coupling the input button to the hammer structure.

4. The VR headset of claim 1, further comprising a pair of aspherical lenses disposed in the lens frame assembly such that images displayed on a display panel of the electronic device disposed in the VR headset against the internal wall of the VR headset are viewable through the pair of aspherical lenses.

5. The VR headset of claim 1, further comprising a silicone pad disposed on an inner surface of the enclosure flap.

6. The VR headset of claim 1, wherein the plurality of flaps include:
    a first side flap;
    a second side flap; and
    a top flap disposed between the first side flap and the second side flap, the top flap having a curved cutout configured to be place against or near a forehead of a user.

7. The VR headset of claim 6, wherein, in the first configuration of the VR headset:

the first side flap is fastened to a first internal side wall of the VR headset; and the second side flap is fastened to a second internal side wall of the VR headset.

8. The VR headset of claim 1, wherein in the first configuration of the VR headset and in the second configuration of the VR headset, the enclosure flap is fastened to an internal top wall of the VR headset.

9. A virtual reality (VR) headset comprising:
a first structural component including:
a plurality of flaps that define an opening for placement of the VR headset near or against a face of a user;
a first portion of an internal wall of the VR headset;
a first portion of a bottom wall of the VR headset;
an inner layer of a lens frame assembly; and
a first outer layer of the lens frame assembly;
a second structural component including:
a second portion of the internal wall of the VR headset, the second portion of the internal wall being fixedly attached to the first portion of the internal wall;
a top wall of the VR headset;
a second outer layer of the lens frame assembly;
a second portion of the bottom wall of the VR headset; and
an enclosure flap hingeably coupled with the second portion of the bottom wall of the VR headset, the enclosure flap being configured to secure an electronic device in the VR headset and against the internal wall;
a third structural component including:
a third portion of the internal wall of the VR headset, the third portion of the internal wall being fixedly attached to the second portion of the internal wall; and
a top rail including an input mechanism, the top rail being hingeably connected to the third portion of the internal wall.

10. The VR headset of claim 9, wherein the plurality of flaps include:
a first side flap;
a second side flap; and
a top flap disposed between the first side flap and the second side flap, the top flap having a curved cutout configured to be placed against or near a forehead of a user.

11. The VR headset of claim 10, wherein the first side flap, the second side flap and the top flap are foldable such that they are disposed between the internal wall and the enclosure flap.

12. The VR headset of claim 9, further comprising a pair of aspherical lenses disposed in the lens frame assembly such that images displayed on a display panel of an electronic device disposed in the VR headset between the enclosure flap the internal wall of the VR headset are viewable through the pair of aspherical lenses.

13. The VR headset of claim 12, wherein an aspherical lens of the pair of aspherical lenses is disposed within a lens opening defined in the inner layer of the lens frame assembly and is held in place by a plurality of retention tabs disposed around a perimeter of the aspherical lens, the plurality of retention tabs being disposed between the first outer layer of the lens frame assembly and the second outer layer of the lens frame assembly.

14. The VR headset of claim 13, wherein the plurality of retention tabs are each disposed within a corresponding notch in the inner layer of the lens frame assembly.

15. The VR headset of claim 9, wherein the input mechanism includes:
an input button disposed on the top rail;
a hammer structure coupled with the top rail, the hammer structure being configured to extend through an opening in the internal wall in response to the input button being depressed; and
a conductive material extending between the input button and the hammer structure, the conductive material electrically coupling the input button to the hammer structure.

16. The VR headset of claim 15, wherein the input mechanism further includes a foam button disposed on the hammer structure, the foam button having a conductive outer surface that is electrically coupled with the input button via, at least the conductive material.

17. The VR headset of claim 15, wherein the input button is accessible through a cutout defined in the plurality of flaps.

18. The VR headset of claim 9, further comprising a silicone pad disposed on an inner surface of the enclosure flap.

19. The VR headset of claim 9, wherein:
the first structural component is formed from a first cardboard sheet;
the second structural component is formed from a second cardboard sheet; and
the third structural component is formed from a third cardboard sheet,
the VR headset being formed by folding the first cardboard sheet, the second cardboard sheet and the third cardboard sheet along a plurality of respective score lines formed thereon.

20. The VR headset of claim 9, wherein:
the plurality of flaps form at least a portion of an outer surface of the VR headset in a first configuration of the VR headset; and
the plurality of flaps is disposed within the enclosure flap in a second configuration of the VR headset.

\* \* \* \* \*

UNITED STATES PATENT AND TRADEMARK OFFICE
CERTIFICATE OF CORRECTION

PATENT NO. : 10,209,769 B2
APPLICATION NO. : 15/158141
DATED : February 19, 2019
INVENTOR(S) : Goossens et al.

It is certified that error appears in the above-identified patent and that said Letters Patent is hereby corrected as shown below:

On the Title Page

Column 1, item (72), in "Inventors", Line 5, delete "Montiero" and insert -- Monteiro --, therefor.

Signed and Sealed this
Eighteenth Day of June, 2019

Andrei Iancu
*Director of the United States Patent and Trademark Office*